US010695835B2

(12) United States Patent
Kovalchuk et al.

(10) Patent No.: US 10,695,835 B2
(45) Date of Patent: Jun. 30, 2020

(54) METHOD AND SYSTEM FOR MANUFACTURING OF THREE DIMENSIONAL OBJECTS

(71) Applicant: JOINT STOCK COMPANY "NVO CHERVONA HVILYA", Kyiv (UA)

(72) Inventors: Dmytro Kovalchuk, Kyiv (UA); Ihor Melnyk, Kyiv (UA); Vitalii Melnyk, Kyiv (UA); Borys Tugai, Kyiv (UA)

(73) Assignee: JOINT STOCK COMPANY "NVO CHERVONA HVILYA", Kyiv (UA)

( * ) Notice: Subject to any disclaimer, the term of this patent is extended or adjusted under 35 U.S.C. 154(b) by 437 days.

(21) Appl. No.: 15/520,184

(22) PCT Filed: Mar. 31, 2015

(86) PCT No.: PCT/UA2015/000029
§ 371 (c)(1),
(2) Date: Apr. 19, 2017

(87) PCT Pub. No.: WO2016/064369
PCT Pub. Date: Apr. 28, 2016

(65) Prior Publication Data
US 2017/0304896 A1  Oct. 26, 2017

(30) Foreign Application Priority Data
Oct. 23, 2014 (UA) ................ A2014 11532

(51) Int. Cl.
*B29C 64/20* (2017.01)
*B22F 3/105* (2006.01)
(Continued)

(52) U.S. Cl.
CPC ........ *B22F 3/1055* (2013.01); *B23K 15/0086* (2013.01); *B29C 64/153* (2017.08);
(Continued)

(58) Field of Classification Search
CPC .................... B22F 3/1055; B29C 64/268
See application file for complete search history.

(56) References Cited

U.S. PATENT DOCUMENTS 7,073,561 B1  7/2006  Henn
7,168,935 B1  1/2007  Taminger et al.
(Continued)

FOREIGN PATENT DOCUMENTS

GB  2094200 A  9/1982

OTHER PUBLICATIONS

International Search Report for PCT/UA2015/000029 dated Jul. 2, 2015.

Primary Examiner — Jacob T Minskey
Assistant Examiner — Cedrick S Williams
(74) Attorney, Agent, or Firm — Dickinson Wright PLLC (57) ABSTRACT

Method and system for manufacturing of three dimensional objects comprising of base substrate (18) placed on the supporting plate (30), electron beam gun (2), feed means (17) for feeding of feedstock material to melting zone, positioning system (31, 36) for positioning of said supporting plate (30) with base substrate (18), vacuum tight operating chamber (29), wherein an energy source for generating of molten pool on the substrate and for melting of feedstock material in said system is gas-discharge electron beam gun (2) with cold circular cathode (8) placed between two circular anodic electrodes placed coaxially to said cathode (8) which generates electron beam (9) in the shape of hollow inverted cone, and feedstock guide (17) is placed along the axis of said of said electron beam gun (2), and said gas-discharge electron beam gun (2) and said feedstock guide (17) are combined in one functional assembly.

32 Claims, 6 Drawing Sheets

(51) Int. Cl.
*B23K 15/00* (2006.01)
*B33Y 10/00* (2015.01)
*B33Y 30/00* (2015.01)
*B29C 64/153* (2017.01)

(52) U.S. Cl.
CPC .............. *B29C 64/20* (2017.08); *B33Y 10/00* (2014.12); *B33Y 30/00* (2014.12); *B22F 2003/1056* (2013.01); *B22F 2003/1058* (2013.01); *Y02P 10/295* (2015.11)

(56) References Cited

U.S. PATENT DOCUMENTS

| | | | |
|---|---|---|---|
| 2003/0116542 A1* | 6/2003 | McGregor | B23K 26/0604 219/121.64 |
| 2011/0061591 A1 | 3/2011 | Stecker | |
| 2015/0298259 A1* | 10/2015 | Colin | B22F 3/1055 219/76.12 |
| 2015/0328719 A1* | 11/2015 | Jarvis | B23K 1/0053 219/76.12 |
| 2015/0360288 A1* | 12/2015 | Zalewski | B29C 64/153 419/38 |

\* cited by examiner

METHOD AND SYSTEM FOR MANUFACTURING OF THREE DIMENSIONAL OBJECTS

CROSS-REFERENCE TO PRIOR APPLICATIONS

This U.S. patent application is a national stage entry and claims priority to PCT Application No. PCT/UA2015/000029, filed Mar. 31, 2015, which claims priority to UA patent Application No. 2014 11532, filed Oct. 23, 2014, each document being incorporated by reference in its entirety for all purposes.

TECHNICAL FIELD

The present invention relates to additive manufacturing, more specifically to methods and systems for manufacturing of three dimensional objects by means of layered deposition of feedstock material on moving substrate where feedstock material is fed to deposition zone on the substrate, melt there by electron beam and then solidifies when it is leaving heating zone resulting in formation of deposited layer of material.

BACKGROUND ART

There are methods and apparatus for manufacturing of three dimensional objects (for example U.S. Pat. No. 7,168,935) according to which three dimensional objects are formed by means of layered deposition of feedstock material on substrate when feedstock material is fed to melting zone moving relative to the substrate, is melt there by energy beam, for example by electron beam, and then solidifies when it is leaving heating zone resulting in formation of solid deposited layer of material. These methods and apparatus have such common character as application of thermionic axial electron beam guns of welding type as energy source for forming of molten pool on the substrate and melting of feedstock material. Such type of guns has appropriate current-voltage characteristics, first of all rather high accelerating voltage (60 kV and more), and they require creation of suitable operating conditions in operating chamber, first of all high vacuum (as a rule 10<"2>Pa and higher). Also electron beam in such methods and apparatus drop on the substrate perpendicular to its surface, and feedstock material, as a rule it is wire, is fed to melting zone from one side under some acute angle.

These characters cause some technological and economy problems among which the following problems must be underlined:

- the requirement to create high vacuum in operating chamber causes essential increase of equipment cost because of usage of expensive high vacuum pumps and reduction of equipment efficiency because of increase of time which is necessary for evacuation of operating chamber before each production cycle;
- relatively high accelerating voltage which is necessary for operation of electron beam gun of welding type causes generating of X-rays inside operating chamber, and protection of operating staff from radiation influence requires usage of much more thick operating chamber walls resulting in increase of weight of complete manufacturing system;
- electron beam guns of welding type must be equipped by individual high vacuum pump for reliable protection of cathode during technological process which increases cost of equipment and makes complete system more large, heavy and complicated one;
- cathodes of electron beam guns of welding type are made from rather expensive materials, nevertheless time of their permanent operation is rather limited;
- usage of powder as feedstock material for deposition is very complicated because of technological reasons;
- control difficulties in providing of feeding of feedstock material in accurate coordination with supply of electron beam to the same point on the substrate-melting zone, particularly taking into account permanent movement of this zone relative to the substrate especially in case when such relative movement is provided by movement both of electron beam gun and feed means in parallel;
- shadow zone is formed on the substrate under the wire because feeding of feedstock wire to melting zone is executed from one side under the acute angle, this fact can cause creation of porosity or cavities in deposited layer because of deposition of molten feedstock material on the solid non-melted substrate, rather complicated irregular thermal fields are generated around melting zone because of the same reason resulting in much more complicated control of deposited material structure which is provided by specified solidification rate in each point, in addition one-sided heating of the wire, from the top, can cause bending of wire because of temperature gradients resulting in difficulties in accurate and stable feeding of feedstock wire directly to melting zone.

The most similar technical solution to the present invention is U.S. Pat. No. 7,073,561 "Solid Freeform Fabrication System and Method".

There is an existing method of solid freeform fabrication which is realized in vacuum through layered deposition of feedstock material on a mold structure, comprising directing an energy beam and feeding feedstock to a feed point (melting zone) adjacent to the mold structure (substrate), thereby forming a molten puddle, moving the feed point relative to the mold structure, thereby advancing the molten puddle of presently fed feedstock and rapidly solidifying previously fed feedstock, and sequentially advancing the feed point within a predetermined geometric volume containing at least a portion of the mold structure, thereby sequentially fusing the feedstock, by action of the advancing molten puddle, into a near net shape work piece built-up upon the mold structure.

Above said mold is fabricated from a material selected from one of: a composite matrix, a metal having a melting point substantially higher than the melting point of the feedstock, boron nitride, an inorganic compound, and graphite.

The said method further comprising the step of separating the mold from the work piece, disintegrating or dissolving the mold.

The energy beam in said method is selected from one of: an electron beam, an ion beam, a plasma beam, a flame spray, a gas tungsten beam, a metal arc, a gas metal arc, a microwave beam, a radio frequency beam, tungsten-inert gas beam, a metal-inert gas beam, and a laser beam.

A solid freeform fabrication system which realizes said existing method comprises a mold structure (substrate), a feed means operable to feed feedstock material to a feed point (melting zone) adjacent to the mold, an energy beam producing means operable to direct an energy beam to said feed point, thereby forming a molten puddle of feedstock material, a movement means coupled to said mold structure and operable to move said feed point relative to the mold, a controller coupled to control movement of said movement means to advance said molten puddle of presently fed feedstock and rapidly solidify previously fed feedstock, and to sequentially advance said feed point within a predetermined geometric volume containing at least a portion of the mold, thereby sequentially fusing the feedstock, by action of said advancing molten puddle, into the near net shape work piece built-up upon the mold support. There are following main disadvantages of above said method and system in embodiment with usage of electron beam as energy beam:

application of electron beam gun of welding type as energy source requires special additional conditions in operating chamber to provide normal operation of the gun, such as creation of high vacuum not less than $10^{-3}$ Pa and usage of individual high vacuum pump for cathode protection during the process, in addition walls of operating chamber must be thick enough to protect operating staff from X-rays generated because of high accelerating voltage, all these requirements result in more large, heavy, complicated and expensive equipment;

in case of usage of powder as feedstock material each granule of powder is getting negative charge under influence of electron beam during the process and granules can fly away from melting zone out of control due to electrostatic repulsion when negative charge accumulation is too high, resulting in uncontrollable deposition of powder causing worse quality of produced work piece and reduced efficiency of powder deposition process (increase of powder loss);

feeding of feedstock wire to melting zone from one side which is applied in said method causes generation of complicated asymmetrical thermal fields around melting zone because of unavoidable creation of shadow zone on the substrate under the wire which can result in creation of porosity or cavities in deposited layer and forming of non-uniform metal structure of produced work piece. In addition one-side heating of the wire, from the top, can cause internal thermal stresses resulting in bending of wire which cause difficulties in accurate and stable feeding of feedstock wire directly to melting zone which also results in violation of stable deposition and solidification conditions. These factors cause difficulties in providing of uniform structure and required quality of solid freeform work pieces fabricated by above said method.

DISCLOSURE OF THE INVENTION

The purpose of the present invention is to develop method and system which provide more easy and less expensive manufacturing of three dimensional objects by means of layered deposition of feedstock material, provide better controllability of deposition process resulting in better quality of manufactured work pieces, expand possibility to use different kinds of feedstock materials, provide more safety working conditions for operating staff as well, provide possibility to design more compact, light, easy and cheap equipment for manufacturing of three dimensional objects.

Positive expected technical result is provided by the method according to the present invention comprising directing of an electron beam to the substrate surface, forming of molten pool on the substrate under influence of said electron beam, feeding of feedstock material to melting zone where said molten pool is forming, melting of said feedstock material by said electron beam and deposition of received additional molten material into said molten pool on the substrate, moving of said melting zone relative to the substrate along trajectory specified by operator or program, forming of solid deposited layer along said trajectory due to solidification of molten feedstock material together with molten pool as soon as melting zone has left zone of directing of said electron beam, repeating of said moving of said melting zone relative to the said substrate along trajectory specified by operator or program with forming of said solid deposited layer upon previously deposited layer necessary number of times up to complete forming of specified three dimensional object, wherein an electron beam in the shape of hollow inverted cone with the apex located near the substrate surface is used for forming of molten pool on the substrate and for melting of feedstock material, and feedstock material is fed to melting zone through feedstock guide directed along the axis of said hollow conical electron beam.

Wire, cored wire and rods can be used as feedstock material.

Also a few wires in bundle can be used as feedstock material which is fed to melting zone through the same feedstock guide, and all or part of wires in bundle can be made from different materials.

Also powder which is fed directly to melting zone through nozzle on the end of feedstock guide can be used as feedstock material. Also mixture of powders of different materials including materials with different physical properties and powders with different fractional composition together can be used as feedstock material.

Feedstock materials in the form of wire, cored wire, rod, wire bundle, powder, mixture of powders can be selected from the following materials: titanium, titanium alloys, intermetallic compounds of titanium, niobium, niobium alloys, intermetallic compounds of niobium, tantalum, tantalum alloys, aluminum, aluminum alloys, intermetallic compounds of aluminum, nickel based alloys, cobalt based alloys, tool steels, composite matrix.

Diameter of melting zone on the substrate and diameter of molten pool accordingly are controlled by change of diameter of circular cross-section of said hollow conical electron beam by substrate surface due to moving of apex of hollow conical electron beam up or down relative to the substrate surface which is executed by means of change of distance between the substrate surface and electron source (electron beam gun).

Process of manufacturing of three dimensional objects according to the present invention is executed under operating vacuum in technological chamber within range of $10-10^{-2}$ Pa.

Positive technical result of the method according to present invention is provided by application of the system comprising of base substrate for forming of three dimensional objects placed on the supporting plate, electron beam gun with power supply, feed means for feeding of feedstock material to melting zone, positioning system for accurate positioning of said supporting plate with base substrate for forming of three dimensional objects, vacuum tight operating chamber for enclosing of said base substrate on supporting plate, said electron beam gun, said feed means and said positioning system of positioning of said supporting plate with base substrate, vacuum system, control system for control of all equipment, mechanisms and instruments included to said manufacturing system, for monitoring of operating conditions of all systems included to said manufacturing system and for control by technological process of manufacturing of three dimensional objects, wherein an energy source for generating of molten pool on the substrate and for melting of feedstock material in said system is gas-discharge electron beam gun with cold circular cathode placed between two circular anodic electrodes placed coaxially to said cathode which generates electron beam in the shape of hollow inverted cone, and feedstock guide for feeding of feedstock material to melting zone is placed along the axis of said electron beam gun, and said gas-discharge electron beam gun and said feedstock guide are combined in one functional assembly.

Said functional assembly comprising gas-discharge electron beam gun and feedstock guide contents base flange with the hole in the center where feedstock guide for feeding of feedstock material is fixed coaxially with the said base flange, gun's body and circular high voltage insulator with attached circular cathode which are fixed to said base flange from below coaxially with it and feedstock guide, and internal circular anodic electrode which is fixed in the hole of said base flange along said feedstock guide and coaxially with it, and gun's body has a function of external circular anodic electrode.

Emission surface of circular cathode has shape of segment of a sphere with the center on the axes of said gas-discharge electron beam gun, and this center determines a position of the apex of hollow conical electron beam generated by said electron beam gun.

Material for manufacturing of cold cathode is selected from one of the following materials: aluminum, aluminum alloys, stainless steels.

Circular insert with the shape of segment of a sphere can be inserted in the emission surface of the circular cathode, and said insert can be made of one of the following materials with high emission ability: aluminum, aluminum alloys, hexaboride of lanthanum.

Circular cathode can be made with possibility of water cooling, in this case circular cathode is made with circular cavity for cooling water.

Circular cathode can be attached to high voltage insulator through circular cathode holder which is made from more strong material than circular cathode is made. Circular cathode holder can be made with possibility of water cooling, in this case circular cathode holder is made with circular cavity for cooling water.

Cylindrical surface of circular cathode can be surrounded by cylindrical by-cathode electrode.

Circular high voltage insulator can have a shape of a ring with extended free surfaces.

Gun's body can be designed with top cylindrical part which is attached to base flange of electron beam gun and bottom conical part which has a shape of inverted conoid.

Structure of feedstock guide can be designed with water cooling completely or partially in its conical part.

Accelerating voltage of gas-discharge electron beam gun can be regulated within limits 1 5-45 kV.

Accelerating voltage of gas-discharge electron beam gun can be regulated within limits 5-1 5 kV.

Power of hollow conical electron beam is provided by gas-discharge electron beam gun with its power supply up to 45 kW and it can be regulated within limits 0-45 kW. Power of hollow conical electron beam is provided by gas-discharge electron beam gun with its power supply up to 1 5 kW and it can be regulated within limits 0-15 kW.

Vacuum system provides operating vacuum in said operating chamber during the process of manufacturing of three dimensional objects within range of $10-10^{<"2>}$Pa.

Operating gas for gas-discharge electron beam gun is selected from one of the following gases: hydrogen, oxygen, mixture of hydrogen and oxygen, nitrogen, helium, argon, air, methane.

Control of electron beam power is accomplished by means of control of electron beam current which is regulated by means of change of operating gas pressure inside the gas-discharge electron beam gun.

Feedstock materials in the form of wire, wire bundle, cored wire, rods, powder, mixture of powders can be selected from the following materials: titanium, titanium alloys, intermetallic compounds of titanium, niobium, niobium alloys, intermetallic compounds of niobium, tantalum, tantalum alloys, aluminum, aluminum alloys, intermetallic compounds of aluminum, nickel based alloys, cobalt based alloys, tool steels, composite matrix.

Feedstock guides for feeding of different kinds of feedstock materials are changeable inside the same said functional assembly comprising gas-discharge electron beam gun and feedstock guide. Said functional assembly comprising gas-discharge electron beam gun and feedstock guide is fixed rigidly inside operating chamber, and moving of said melting zone relative to the said base substrate along trajectory specified by operator or program is provided by means of moving of said supporting plate with attached base substrate for forming of specified three dimensional objects under control of said positioning system.

Said functional assembly comprising gas-discharge electron beam gun and feedstock guide is fixed rigidly on the top plate of said operating chamber in such way that only that parts of said gas-discharge electron beam gun which are attached to the said base flange of said functional assembly from below are placed inside vacuum space of operating chamber, and feedstock material in this case is fed to operating chamber from outside through feedstock guide by means of feed means equipped by sealing inserts. In this case movement of melting zone relative to the substrate along trajectory specified by operator or program is provided by means of movement of supporting plate with attached base substrate for forming of specified three dimensional objects under control of positioning system of accurate positioning of the base substrate.

Said functional assembly comprising gas-discharge electron beam gun and feedstock guide is fixed rigidly on the top plate of said operating chamber through intermediate tubular spacer placed from the internal side of the top plate of said operating chamber. In this case feedstock material is also fed to operating chamber from outside through feedstock guide by means of feed means equipped by sealing inserts and movement of melting zone relative to the substrate along trajectory specified by operator or program is provided by means of movement of supporting plate with attached base substrate for forming of specified three dimensional objects under control of positioning system of accurate positioning of the base substrate.

Said functional assembly comprising gas-discharge electron beam gun and feedstock guide is placed completely inside said operating chamber and it is fixed on the frame of positioning system which provides its moving and positioning inside three dimensional space of said operating chamber providing accordingly moving of said melting zone relative to the base substrate along trajectory specified by operator or program.

Configuration of said functional assembly comprising gas-discharge electron beam gun which generates hollow conical electron beam and feedstock guide which feeds feedstock material coaxially with said hollow conical electron beam according to the present invention provides forming of practically round molten pool on the substrate and feeding of feedstock material perpendicular to the substrate surface exactly to the center of said molten pool. Due to this fact said method and system in embodiment with usage of wire or rod as feedstock material completely exclude creation of any shadow zone at molten pool and near it because feedstock material never locate on the way of electron beam to the substrate.

Due to absence of said shadow zone at molten pool and near it no any special measures are required for sustaining of liquid condition of material in the whole molten pool for example by special scanning of electron beam along complicated trajectories for providing of non-uniform distribution of beam energy in the molten pool and around it.

Uniform axisymmetric heating of feedstock material in configuration of said functional assembly with usage of wire or rod as feedstock material excludes any possibilities of bending of wire or rod near melting zone because any non-uniform internal thermal stresses are excluded.

In embodiment of present invention with usage of powder as feedstock material said functional assembly provides feeding of all feedstock powder strictly perpendicular to the substrate surface and exactly to the center of said molten pool practically excluding powder loss because hitting of powder on solid substrate surface around the molten pool with resulting rebound of powder granules from solid surface is excluded.

Perpendicular feeding of feedstock powder directly to the center of molten pool coaxially with hollow conical electron beam provided by method and system of present invention also excludes flying away of powder granules with accumulated negative charge from melting zone due to electrostatic repulsion because powder stream is completely surrounded by hollow conical electron beam which have much more negative charge than each powder granule has and does not allow powder granules to go beyond of surface of imaginary cone formed by electron beam. Above said characters of present invention in configuration with usage of powder as feedstock material provide significant (up to 100%) increase of efficiency of feedstock material usage.

In addition configuration of powder feeding in present invention permits much less requirements to the shape of powder granules and its fractional composition which can be involved to process as feedstock material, provides possibility to use mixture of powders from different materials with different physical properties and different fractional composition together.

Round axisymmetric shape of molten pool and the fact of feeding of feedstock material perpendicular to the substrate surface exactly to the center of said molten pool provided by the present invention significantly simplify physical and mathematical modelling of thermal processes inside molten pool and around it and real time control of these running processes resulting in much better control of forming of structure of solidified layer which directly depends on cooling and solidifying rate of molten materials. This advantage allows significant improvement of quality of manufactured three dimensional objects due to providing of preliminary specified structure of material which is formed by manufacturing process according to the present invention.

Round axisymmetric shape of molten pool and the fact of feeding of feedstock material perpendicular to the substrate surface exactly to the center of said molten pool also significantly simplify monitoring of processes inside molten pool and around it and moreover said monitoring can be fulfilled both by direct visual observation and by secondary control methods such as controlling by reflected electrons, by secondary emission of electrons from surface of molten pool, by temperature fields etc. Significant technical and economic advantages of method and system for manufacturing of three dimensional objects according to the present invention are provided by usage of gas-discharge electron beam gun with cold cathode as source for generating of hollow conical electron beam.

Internal space of such electron beam gun is evacuated directly through exit hole or gap for electron beam by general vacuum system of technological installation wherein this gun is installed. Accelerating voltage within limits 5-45 kV is applied on the cathode of the gas-discharge electron beam gun when vacuum in operating chamber reach operating level as a rule within the range from a few Pa to a few hundredths Pa. Operating gas for example hydrogen, oxygen, mixture of hydrogen and oxygen, helium or other gases is supplied to discharge chamber of die gas-discharge electron beam gun through inlet nipple. High voltage glow discharge with anode plasma is initiated inside gun's discharge chamber between cathode and anode under above said conditions. Said anode plasma is source of ions which are accelerated by electric field at zone of cathode potential drop and bombard surface of cold cathode causing electron emission. The same electric field at zone of cathode potential drop accelerates electrons emitted from cathode surface and forms an electron beam which shape is determined by configuration of cathode emission surface because emitted electrons fly away from the cathode surface exactly perpendicular to this surface in each point of emission. Thus for example if cold cathode has shape of a circle located between two circular anode electrodes oriented coaxially to the said cathode and emission surface of said cathode has a shape of segment of a sphere with the center on the axes of gas-discharge electron beam gun, the electron beam with the shape of hollow inverted cone will be formed in result of electron emission from such cathode, and the apex of said cone will coincide with position of the center of said imaginary sphere. Accordingly primary focusing of electron beam of such electron beam gun is provided by geometry of emission surface of the cathode and does not require application of separate focusing system. Power of electron beam generated by gas-discharge electron beam gun is regulated by change of electron beam current which is controlled by change of pressure inside discharge chamber of the gun by means of increase or reduction of operating gas supply rate.

Thus thanks to above said operating principles of gas-discharge electron beam guns manufacturing of three dimensional objects in systems equipped by such type of electron beam guns can be fulfilled under vacuum in operating chamber within range of 10 . . . 0.01 Pa. This fact excludes necessity of usage of high vacuum pumps in the set of vacuum equipment and significantly reduces evacuation time to reach permissible operating conditions in operating chamber resulting in higher general productivity of equipment for manufacturing of three dimensional objects in comparison with similar manufacturing systems equipped by thermionic electron beam guns. Also gas-discharge electron beam gun does not require usage of individual high vacuum pumps to create necessary vacuum inside the gun for cathode protection. Accordingly total cost of vacuum system of equipment for manufacturing of three dimensional objects equipped by gas-discharge electron beam gun is much less than cost of similar system equipped by thermionic electron beam guns. In addition total weight of complete system for manufacturing of three dimensional objects is also significantly reduced which is very important in some cases of application of such equipment for example on the board of spacecraft. Cold cathode of gas-discharge electron beam gun is made as usual from non-expansive materials and it has extremely long life time. This feature also reduces cost and operating expenses of equipment for manufacturing of three dimensional objects.

Ability of gas-discharge electron beam gun to generate an electron beam of good quality under relatively low accelerating voltage permits to reduce intensity of X-rays generated from substrate material under influence of electron beam. Thanks to this fact wall thickness of operating chamber may be reduced without violation of safety requirements to radiation protection of operating staff. Accordingly total weight of complete system for manufacturing of three dimensional objects is also significantly reduced which is very important in some cases of application of such equipment for example on the board of spacecraft.

Functional assembly 1 consists of gas-discharge electron beam gun 2 and feedstock guide 3 which are combined in one assembly unit by means of rigid fixing of feedstock guide body 5 in the central hole of base flange 4 of the said electron beam gun coaxially with said base flange. Cylindrical pan of gun's body 6 and circular high voltage insulator 7 are fixed to base flange 4 from below coaxially with it. Circular cathode 8 is attached to circular high voltage insulator 7 in such way that high voltage insulator provides reliable insulation of circular cathode which operates under high negative potential from other parts of the gun. Emission surface 8a of circular cathode 8 has a shape of segment of a sphere which center determines a position of apex 9a of hollow inverted cone formed by electron beam 9 generated by gas-discharge electron beam gun 2. Internal circular anodic electrode 10 is fixed coaxially in the central hole of base flange 4 along feedstock guide body 5, and gun's body consisted of cylindrical part 6 and conical part 1 1 has a function of external anodic electrode. Conical part 1 1 of gun's body and feedstock guide body 5 form a discharge space 12 of gas-discharge electron beam gun 2. Conical part 1 3 of feedstock guide and bottom end of conical part 1 1 of gun's body form circular gap for exit of hollow conical electron beam 9 outside of the gas-discharge electron beam gun 2. Operating gas is supplied to discharge space 12 of the gun through nipple embedded to cylindrical part 6 of gun's body or to the base flange 4 (it is not presented on the picture). High voltage is applied to the cathode through feedthrough 15 which is embedded in electrically insulated hole in the base flange 4. Feedstock material 16 (in the embodiment presented on FIG. 1 it is a wire) is fed to feedstock guide 3 from the top end by feed means 1 7.

Figure 1:
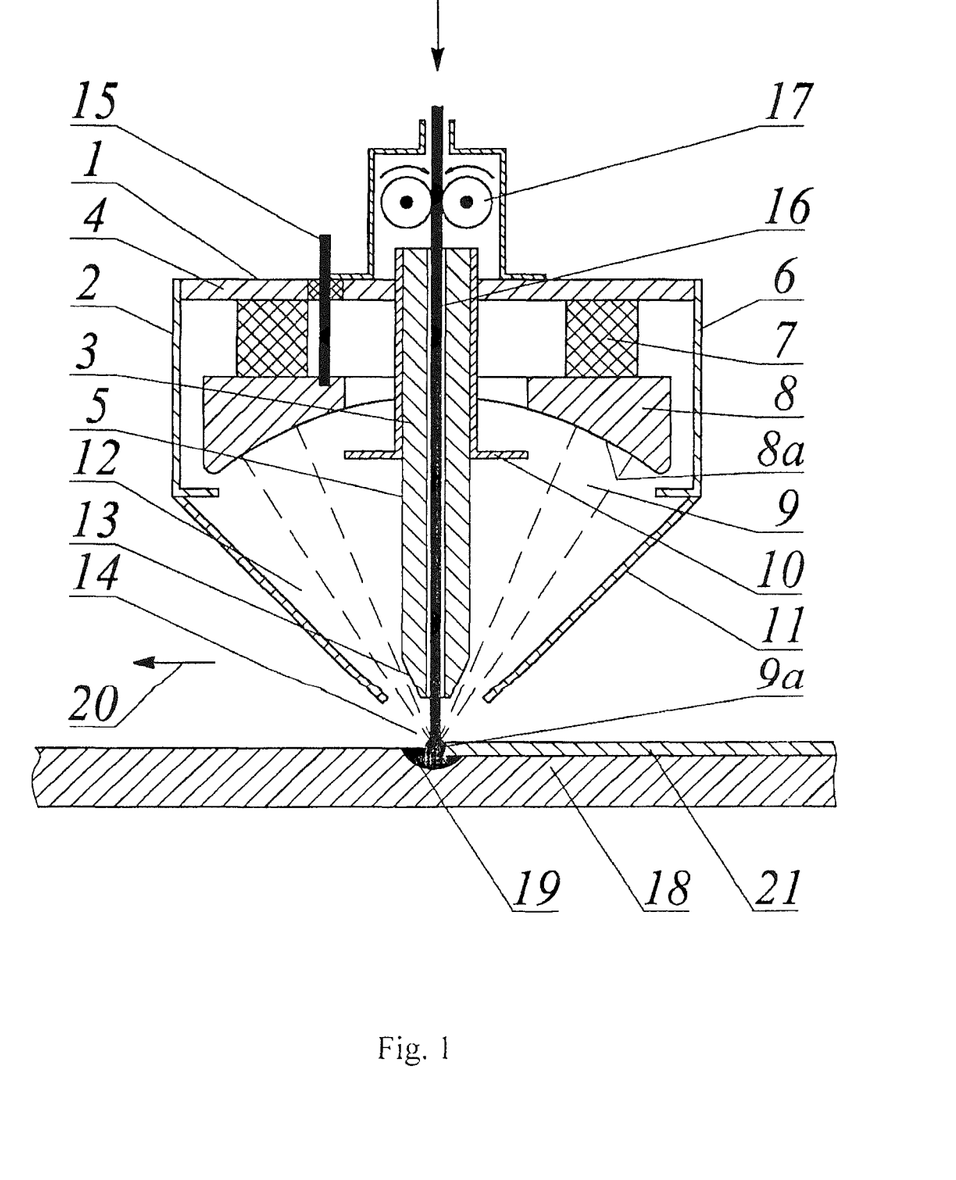
FIG. 1 shows schematic design of functional assembly comprising gas-discharge electron beam gun and feedstock guide which is the key component part of the system for manufacturing of three dimensional objects according to the present invention.

Functional assembly 1 is placed relative to substrate 18 in such way that apex 9a of hollow inverted cone formed by electron beam 9 is located near the surface of substrate 18. Due to such location energy of concentrated electron beam 9 causes melting of substrate material with forming of molten pool 19 on the surface of substrate 18. Feedstock material 16 in the form of wire is fed to zone where molten pool 19 is forming (to melting zone), the end of wire is uniformly embraced by hollow conical electron beam 9 resulting in melting by influence of electron beam energy directly inside molten pool 19 or slightly above it in such way that molten feedstock material from the end of wire trickles down exactly to the center of molten pool 19.

Arrow 20 on the FIG. 1 symbolically indicates movement of functional assembly 1 relative to the substrate 18 which means accordingly movement of molten pool 19. Molten pool which was formed during preliminary position of functional assembly 1 quickly solidifies as soon as it leaves zone of electron beam heating (melting zone) due to heat transfer to the substrate body and due to heat radiation from molten pool surface with formation of solid deposited layer (molten puddle) 21 and resulting in growing of substrate thickness on some value. It should be noted that movement of functional assembly 1 relative to the substrate 18 can be fulfilled by means of movement of functional assembly 1 or substrate 18 or by movement of both these parts in the same time.

Figure 2:
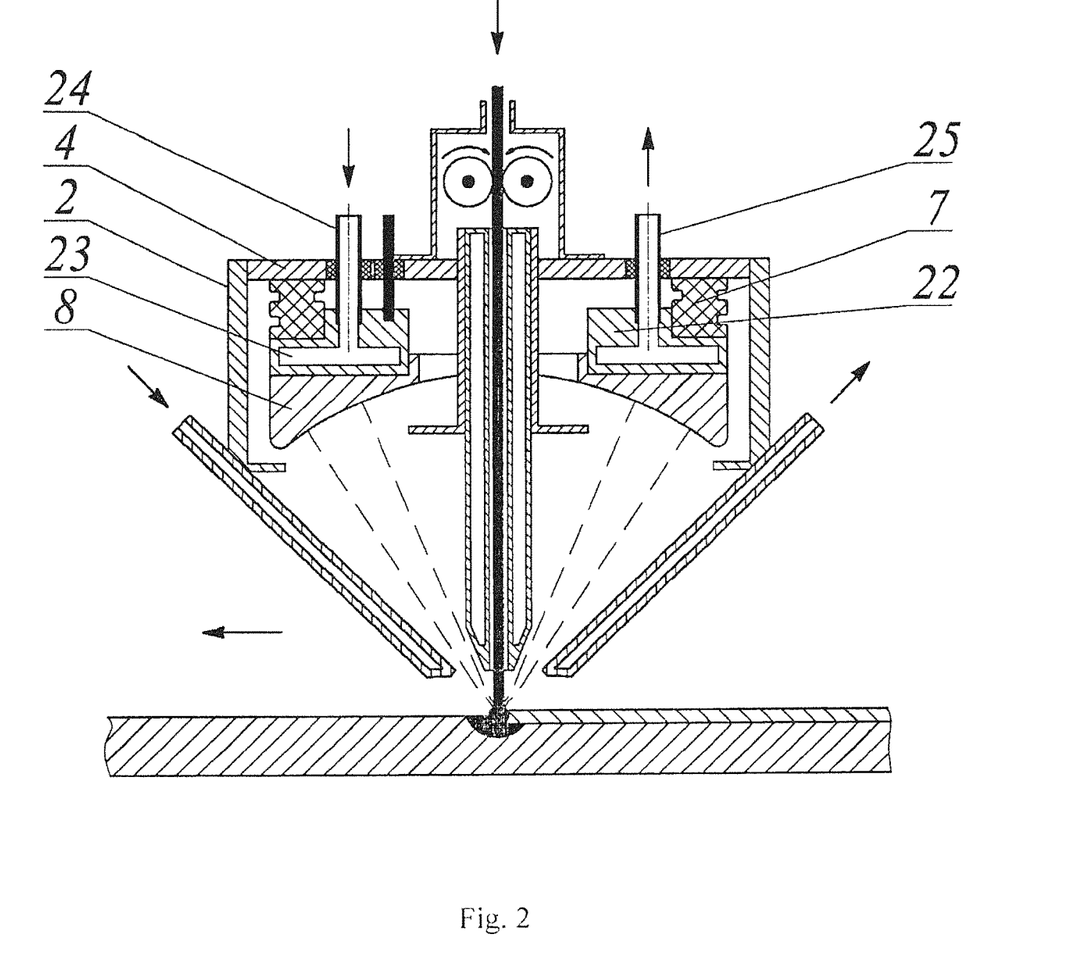

FIG. 2 shows an alternative embodiment of functional assembly comprising gas-discharge electron beam gun and feedstock guide with a few possible design solutions. In this variant circular cathode 8 is attached to high voltage insulator 7 through circular cathode holder 22 which is made from more strong material than cathode is made. Circular cathode holder 22 at this variant is designed with circular cavity 23 for cooling water, inlet nipple 24 and outlet nipple 25 for supply and drain of cooling water to circular cathode holder 22 accordingly are embedded in electrically insulated holes in the base flange 4. Also FIG. 2 shows a variant of functional assembly design wherein conical part 1 1 of gas-discharge electron beam gun and feedstock guide structure are made with water cooling. Also FIG. 2 shows a variant of design of high voltage insulator 7 wherein it is made in shape of a ring with extended free surfaces, at the same time showed configuration of extended free surfaces is only an example which not excludes application of other surface configurations depending on applied current-voltage characteristics of gas-discharge electron beam gun.

Figure 3:
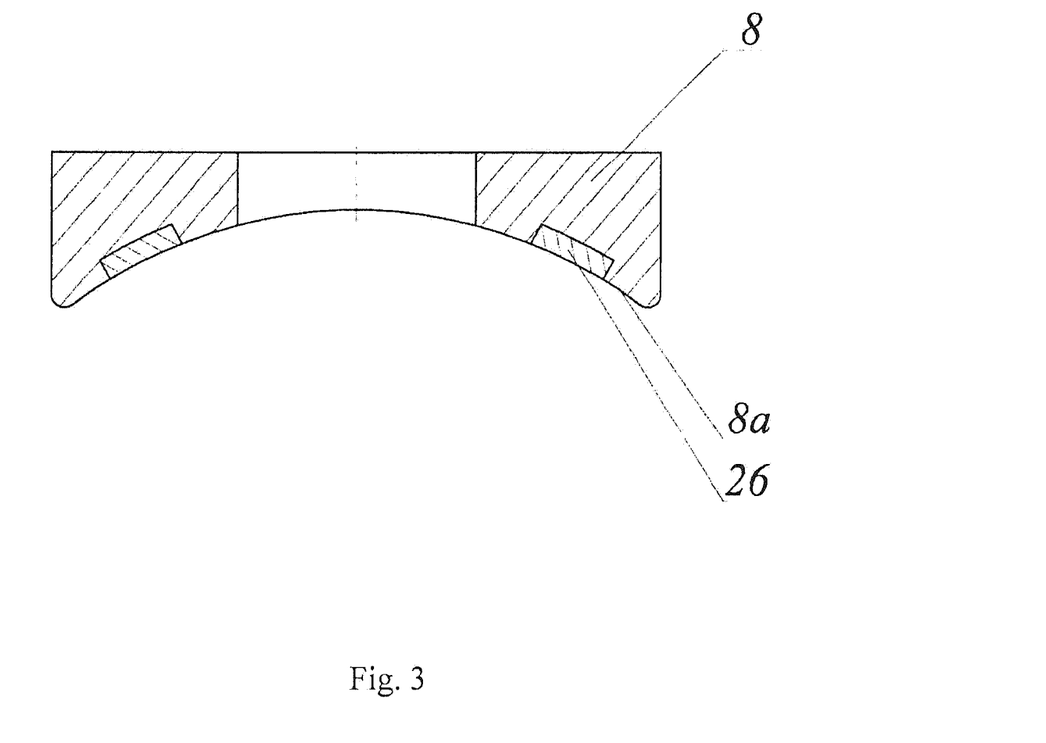

FIG. 3 shows schematic design of circular cathode 8 in variant wherein circular insert 26 with the shape of segment of a sphere which is made of the materials with higher emission ability is inserted in the emission surface 8a of the circular cathode.

Figure 4:
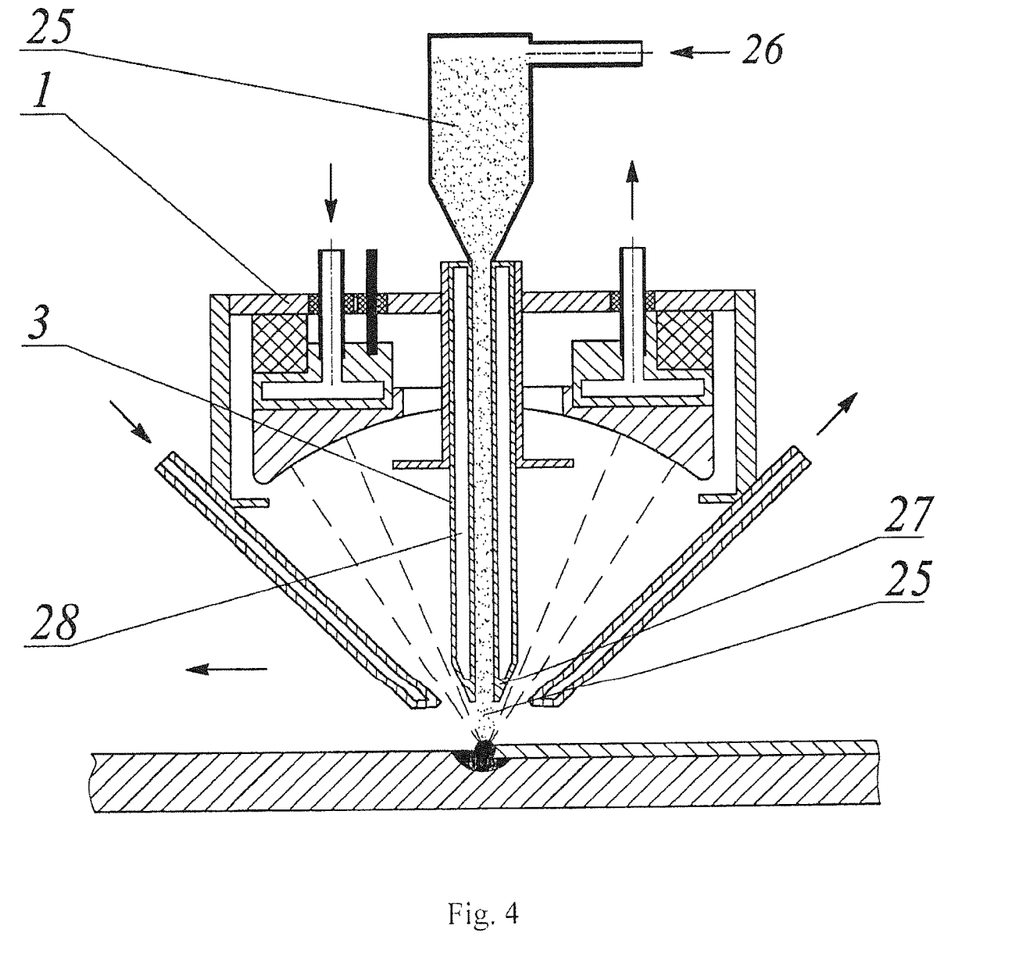

FIG. 4 shows schematic design of an embodiment of functional assembly 1 comprising gas-discharge electron beam gun and feedstock guide wherein powder 25 is used as feedstock material. In showed configuration feedstock powder 25 is fed to the melting zone by gas flow 26 through nozzle 27 on the end of feedstock guide 3. One of the numerous industrial methods of powder supply and configurations of nozzle can be applied for feeding of powder depending on powder material, fraction composition, carrier gas and other physical and chemical characteristics of powder. FIG. 4 also shows a design of feedstock guide 3 with water cooling 28.

Figure 5:
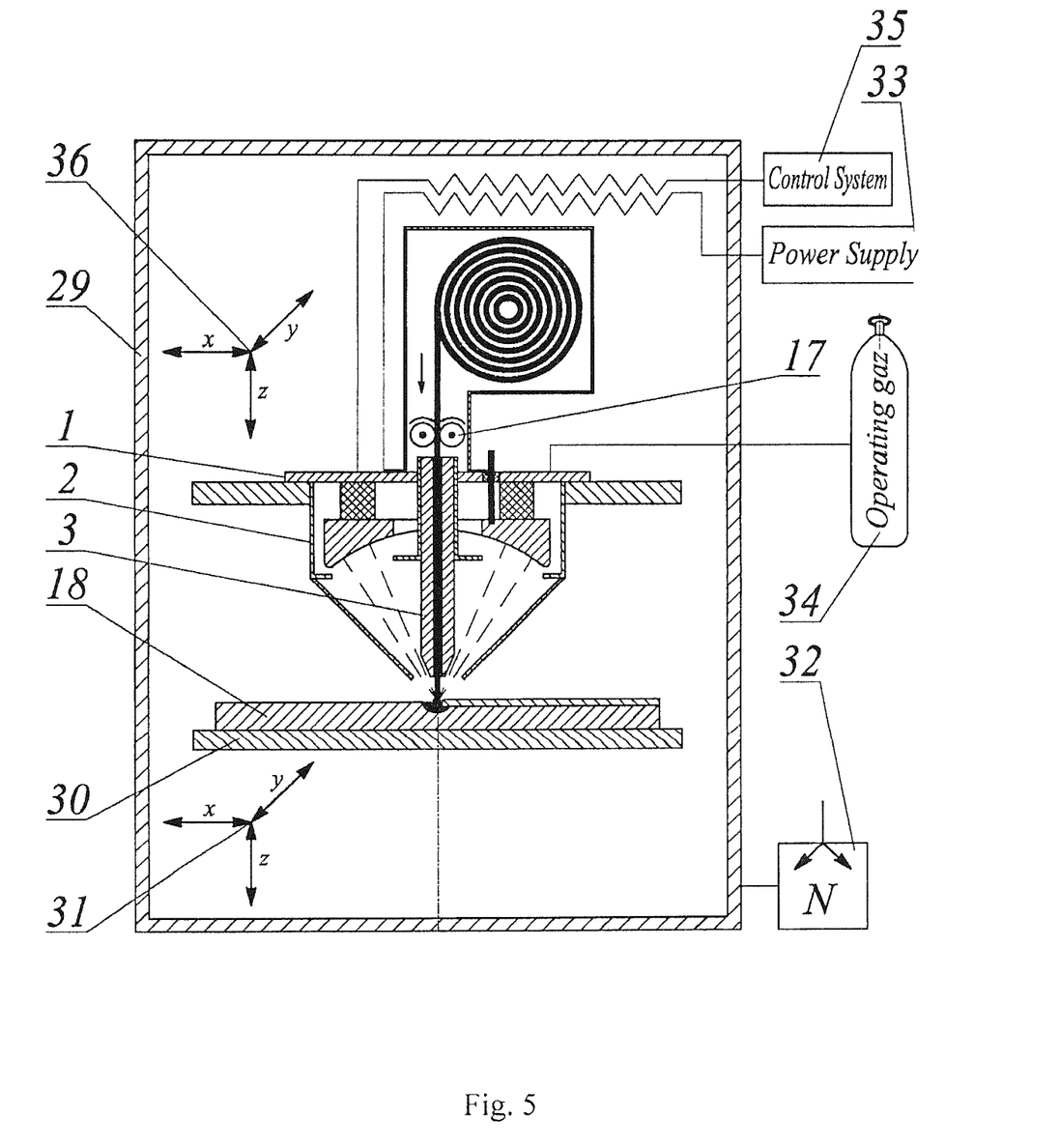

FIG. 5 shows schematic design of the complete system for manufacturing of three dimensional objects according to the present invention in embodiment where functional assembly 1 comprising gas-discharge electron beam gun 2 and feedstock guide 3 together with feed means 17 are placed completely inside operating chamber. Said complete system consists of vacuum tight operating chamber 29, said functional assembly 1 comprising gas-discharge electron beam gun 2 and feedstock guide 3, said feed means 1 7, base substrate 18 for forming of three dimensional objects placed on the supporting plate 30, accurate positioning systems 3 1 and 36 for providing of movement of melting zone relative to the substrate along trajectory specified by operator or program, vacuum system 32, high voltage power supply 33 for gas-discharge electron beam gun, gas supply system 34 for gas-discharge electron beam gun, control system 35 for control of all equipment, mechanisms and instruments which are parts of said complete manufacturing system, for monitoring of operating conditions of all systems and for control by technological process of manufacturing of three dimensional objects. There are two variants to provide movement of melting zone relative to the substrate in embodiment with complete placement of said functional assembly inside operating chamber—first one is with placement of supporting plate with attached base substrate on the moving platform of positioning system 3 1 and with rigidly fixed functional assembly, second one is with placement of functional assembly on the moving platform of positioning system 36 and with rigidly fixed supporting plate with attached base substrate.

Figure 6:
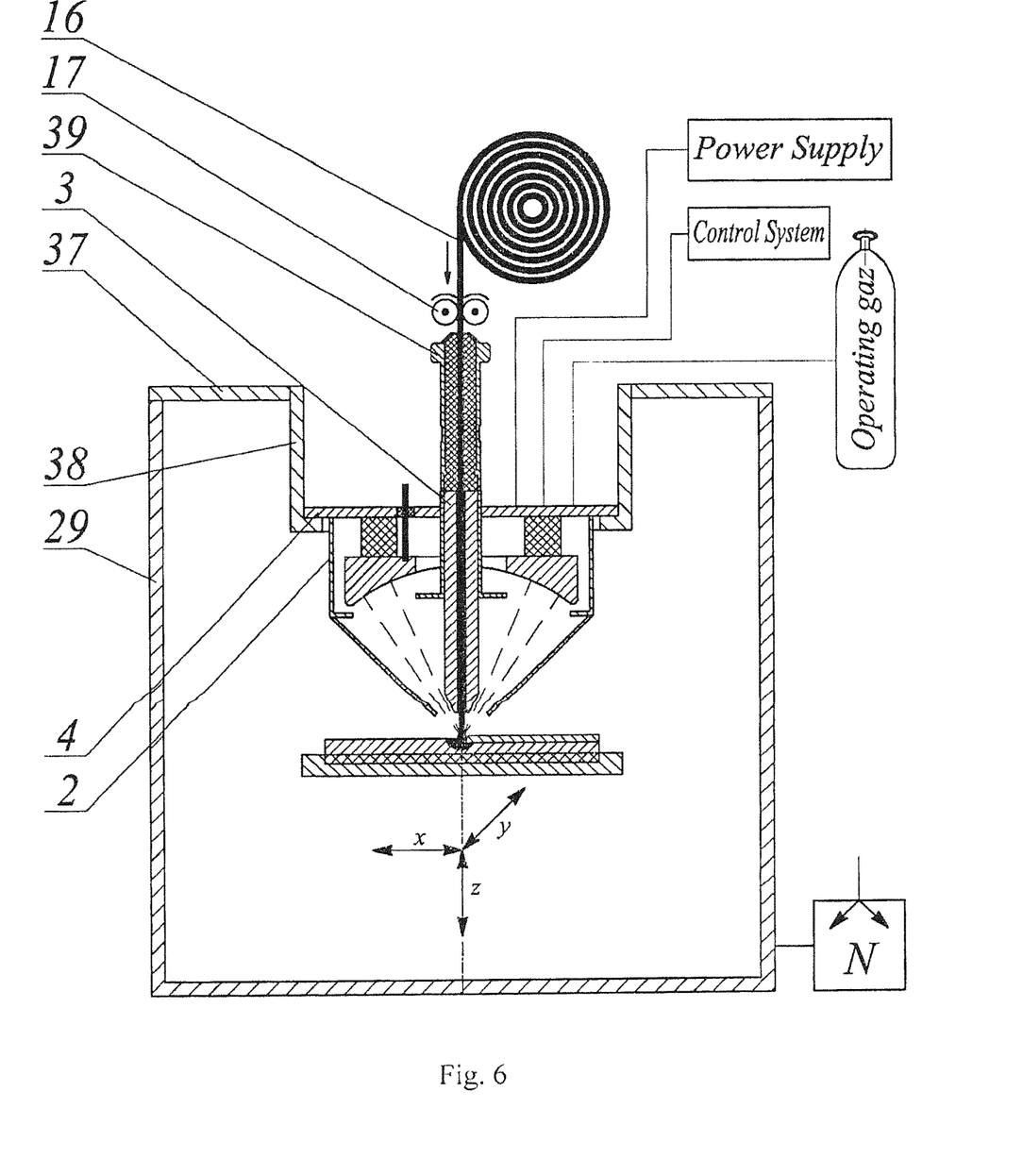

FIG. 6 shows schematic design of the complete system for manufacturing of three dimensional objects according to the present invention in embodiment where functional assembly comprising gas-discharge electron beam gun 2 and feedstock guide 3 is fixed rigidly on the top plate 37 of operating chamber 28 through intermediate tubular spacer 38 in such way that only that parts of said gas-discharge electron beam gun 2 which are attached to the base flange 4 of said functional assembly from below are placed inside vacuum space of operating chamber 29, and feedstock material 16 in this case is fed to operating chamber from outside through feedstock guide by means of feed means equipped by sealing inserts 39. In this case movement of melting zone relative to the substrate along trajectory specified by operator or program is provided by means of placement of supporting plate with attached base substrate on the moving platform of positioning system.

INDUSTRIAL APPLICABILITY

The method and system for manufacturing of three dimensional objects presented by this invention can be used for effective manufacturing of high quality parts of complex configuration especially made of reactive materials which melting processes require usage of protective atmosphere and of energy sources with high power concentration for example such as titanium, titanium alloys, intermetallic compounds of titanium, niobium, niobium alloys, intermetallic compounds of niobium, tantalum, tantalum alloys, aluminum, aluminum alloys, intermetallic compounds of aluminum, nickel based alloys, cobalt based alloys, tool steels, composite matrix. Also presented method and system can be effectively applied under conditions where weight and dimensions of complete manufacturing system for manufacturing of three dimensional objects are critical parameters for example on the board of spacecraft.

Obviously, many modifications and variations of the present invention are possible in light of the above teachings and may be practiced otherwise than as specifically described while within the scope of the following claims.

What is claimed is:

1. A method of manufacturing of three dimensional objects comprising the steps of:
    forming of molten pool on the substrate under influence of an electron beam,
    feeding of feedstock material to melting zone where said molten pool is forming,
    melting of said feedstock material by said electron beam and deposition of received additional molten material into said molten pool on the substrate,
    moving of said melting zone relative to the substrate along trajectory specified by operator or program,
    forming of solid deposited layer along said trajectory due to solidification of molten feedstock material together with molten pool as soon as melting zone has left zone of directing of said electron beam,
    repeating of said moving of said melting zone relative to the said substrate along trajectory specified by operator or program necessary number of times up to complete forming of specified three dimensional object,
    wherein an electron beam in the shape of hollow inverted cone with the apex located near the melting zone is used for forming of molten pool on the substrate and for melting of feedstock material, and feedstock material is fed to melting zone through feedstock guide directed along the axis of said hollow conical electron beam wherein said electron beam in the shape of hollow inverted cone is generated directly by a cathode of a gas-discharge electron beam gun and without a separate focusing system.

2. The method of claim 1 wherein said feedstock material is a wire, cored wire or rod.

3. The method of claim 1 wherein said feedstock material is a few wires in bundle which is fed to said melting zone through the same feedstock guide, and all or part of wires in bundle can be made from different materials.

4. The method of claim 1 wherein said feedstock material is a powder which is fed directly to said melting zone through nozzle on the end of feedstock guide.

5. The method of claim 1 wherein said feedstock material is a mixture of powders of different materials including materials with different physical properties and powders with different fractional composition together.

6. The method of claim 1 wherein said feedstock material in the form of wire, cored wire, rod, wire bundle, powder, mixture of powders are made of the following materials: titanium, titanium alloys, intermetallic compounds of titanium, niobium, niobium alloys, intermetallic compounds of niobium, tantalum, tantalum alloys, aluminum, aluminum alloys, intermetallic compounds of aluminum, nickel based alloys, cobalt based alloys, tool steels, composite matrix.

7. The method of claim 1 wherein diameter of said melting zone on the substrate and diameter of said molten pool accordingly are controlled by change of diameter of circular cross-section of said hollow conical electron beam by substrate surface due to moving of apex of hollow conical electron beam up or down relative to the substrate surface which is executed by means of change of distance between the substrate surface and electron source.

8. The method of claim 1 wherein process of manufacturing of three dimensional objects is executed under vacuum in operating chamber within range $10-10^{-2}$ Pa.

9. A system for manufacturing of three dimensional objects comprising of:
    base substrate for forming of three dimensional objects placed on the supporting plate, electron beam gun with power supply, which is an energy source for forming of molten pool on the said substrate,
    feed means for feeding of feedstock material dedicated for layered manufacturing of three dimensional objects to melting zone,
    positioning system for accurate positioning of said supporting plate with base substrate for forming of three dimensional objects,
    vacuum tight operating chamber for enclosing of said base substrate on supporting plate, said electron beam gun, said feed means and said positioning system of positioning of said supporting plate with base substrate, vacuum system, control system for control of all equipment, mechanisms and instruments included to said manufacturing system, for monitoring of operating conditions of all systems included to said manufacturing system and for control by technological process of manufacturing of three dimensional objects, wherein an energy source for generating of molten pool on the substrate and for melting of feedstock material in said system is gas-discharge electron beam gun with cold circular cathode placed between two circular anodic electrodes placed coaxially to said cathode which generates electron beam in the shape of hollow inverted cone, and feedstock guide for feeding of feedstock material to melting zone is placed along the axis of said electron beam gun, and said gas-discharge electron beam gun and said feedstock guide are combined in one functional assembly.

10. The system of claim 9 wherein said functional assembly comprising gas-discharge electron beam gun and feedstock guide contents base flange with the hole in the center where feedstock guide for feeding of feedstock material is fixed coaxially with the said base flange, gun's body and circular high voltage insulator with attached circular cathode are fixed to said base flange from below coaxially with it and feedstock guide, and internal circular anodic electrode is fixed in the hole of said base flange along said feedstock guide and coaxially with it, and gun's body has a function of external circular anodic electrode.

11. The system of claim 9 wherein emission surface of circular cathode has a shape of segment of a sphere with the center on the axes of said gas-discharge electron beam gun, and this center determines a position of the apex of the hollow conical electron beam generated by said electron beam gun.

12. The system of claim 9 wherein material for manufacturing of said circular cathode is selected from one of the following materials: aluminum, aluminum alloys, stainless steels.

13. The system of claim 9 wherein circular insert with the shape of segment of a sphere is inserted in the emission surface of the said circular cathode, and said insert is made of one of the following materials with high emission ability: aluminum, aluminum alloys, hexaboride of lanthanum.

14. The system of claim 9 wherein circular cathode is made with possibility of water cooling with circular cavity for cooling water.

15. The system of claim 9 wherein said circular cathode is attached to said high voltage insulator through circular cathode holder which is made from more strong material than circular cathode is made.

16. The system of claim 9 wherein said circular cathode holder is made with possibility of water cooling with circular cavity for cooling water.

17. The system of claim 9 wherein cylindrical surface of said circular cathode is surrounded by cylindrical by-cathode electrode.

18. The system of claim 9 wherein said high voltage insulator has a shape of a ring with extended free surfaces.

19. The system of claim 9 wherein said electron beam gun's body has top cylindrical part which is attached to said base flange of gas-discharge electron beam gun and bottom conical part which has a shape of inverted conoid.

20. The system of claim 9 wherein structure of feedstock guide is designed with water cooling completely or partially in its conical part.

21. The system of claim 9 wherein operating accelerating voltage of said electron beam gun is within range 5-45 kV and is regulated within these limits.

22. The system of claim 9 wherein said electron beam gun with its power supply provide power of said hollow conical electron beam up to 45 kW and power of electron beam is regulated within range 0-45 kW.

23. The system of claim 9 wherein said electron beam gun with its power supply provide power of said hollow conical electron beam up to 45 kW and power of electron beam is regulated within range 0-15 kW.

24. The system of claim 9 wherein said vacuum system provides operating vacuum in said operating chamber during the process of manufacturing of three dimensional objects within range $10\text{-}10^{-2}$ Pa.

25. The system of claim 9 wherein operating gas for gas-discharge electron beam gun is selected from one of the following gases: hydrogen, oxygen, mixture of hydrogen and oxygen, nitrogen, helium, argon, air, methane.

26. The system of claim 9 wherein control of electron beam power is fulfilled by control of electron beam current which is regulated by means of change of operating gas pressure inside the gas-discharge electron beam gun.

27. The system of claim 9 which provides usage of feedstock materials in the form of wire, cored wire, rod, wire bundle, powder, mixture of powders selected from the following materials: titanium, titanium alloys, intermetallic compounds of titanium, niobium, niobium alloys, intermetallic compounds of niobium, tantalum, tantalum alloys, aluminum, aluminum alloys, intermetallic compounds of aluminum, nickel based alloys, cobalt based alloys, tool steels, composite matrix.

28. The system of claim 9 wherein feedstock guides for feeding of different kinds of feedstock materials are changeable inside the same structure of said functional assembly comprising gas-discharge electron beam gun and feedstock guide.

29. The system of claim 9 wherein said functional assembly comprising gas-discharge electron beam gun and feedstock guide is fixed rigidly inside operating chamber, and moving of melting zone where molten pool is formed and feedstock material is fed relative to the said base substrate along trajectory specified by operator or program is provided by means of moving of said supporting plate with attached base substrate for forming of specified three dimensional objects under control of said positioning system.

30. The system of claim 9 wherein said functional assembly comprising gas-discharge electron beam gun and feedstock guide is fixed rigidly on the top plate of said operating chamber in such way that only that parts of said electron beam gun which are attached to the said base flange of said functional assembly from below are placed inside vacuum space of operating chamber, and feedstock material is fed to said operating chamber from outside through feedstock guide by means of feed means equipped by sealing inserts.

31. The system of claim 30 wherein said functional assembly comprising electron beam gun and feedstock guide is fixed rigidly on the top plate of said operating chamber through intermediate spacer placed from the internal side of the top plate of said operating chamber.

32. The system of claim 9 wherein said functional assembly comprising electron beam gun and feedstock guide is installed with possibility of movement within three dimensional space of operating chamber due to its rigid fixing on the frame of positioning system providing accordingly moving of said melting zone where molten pool is formed and feedstock material is fed relative to the base substrate along trajectory specified by operator or program.

* * * * *